(12) United States Patent
Campaigne et al.

(10) Patent No.: US 6,496,812 B1
(45) Date of Patent: Dec. 17, 2002

(54) METHOD AND SYSTEM FOR MEASURING AND VALUING CONTRIBUTIONS BY GROUP MEMBERS TO THE ACHIEVEMENT OF A GROUP GOAL

(75) Inventors: Crystal Campaigne, Melrose, MA (US); Philip James Campaigne, Harvard, MA (US)

(73) Assignee: Object Power, Inc., Harvard, MA (US)

( * ) Notice: Subject to any disclaimer, the term of this patent is extended or adjusted under 35 U.S.C. 154(b) by 0 days.

(21) Appl. No.: 09/571,874

(22) Filed: May 13, 2000

(51) Int. Cl.[7] ................................. G06E 1/00
(52) U.S. Cl. ........................... 706/16; 706/15
(58) Field of Search .............. 706/46, 45, 12, 706/16, 15

(56) References Cited

U.S. PATENT DOCUMENTS

2001/0017604 A1 * 8/2001 Jacobsen et al. .............. 345/27
2002/0013631 A1 * 1/2002 Parunak et al. ............... 700/28
2002/0036617 A1 * 3/2002 Pryor ........................ 345/156

OTHER PUBLICATIONS

Anil K. Jain et al; Artificial Neural Networks: a Tutorial; 1996; IEEE; 0018–9162/96; 31–44.*

* cited by examiner

Primary Examiner—Thomas Black
Assistant Examiner—Joseph P. Hirl

(57) ABSTRACT

A method and system for human or computer-based group-members to interact with peers to craft an action sequence to achieve a group goal. Method includes means for guiding group members on how to integrate their activities in pursuit of a specific pre-defined group goal, when given only partial understanding of how they can achieve said goal. The method identifies, selects, values and integrates group-member actions that are causal to a group achievement. The system incorporates the method along with means for recording, assigning value and reporting contributions by group members. System also includes an apparatus consisting of head-mounted microphone, voice recognition software and miniature video screen in field of view to aid data collection in applications where events occur in rapid sequence. For computer-based group members, system includes unsupervised neural network embodied in a computer mechanism and means to evaluate the instant activity and immediately relate processed information to guide the integration of group members actions.

4 Claims, 14 Drawing Sheets

Action (ACT) Sequence Flow

Containment Diagram Showing Abstractions

Team-Member Interaction Protocol (TIP)

Communications Network Topology:

Peer-to-peer    ---------------
Star            _____

Data Collection Apparatus

Action Scoring Mechanism

METHOD AND SYSTEM FOR MEASURING AND VALUING CONTRIBUTIONS BY GROUP MEMBERS TO THE ACHIEVEMENT OF A GROUP GOAL

BACKGROUND—Field of Invention

This invention relates to groups of humans or groups of artificially intelligent machines, specifically to improving their efficiency in attaining group goals.

BACKGROUND—Discussion of Prior Art

As we enter the twenty-first century increasingly more of the problems that must be solved by humans are complex in nature. Their solutions require the cooperative effort of group members with different but complementary skills and experience who must interact quickly and efficiently to craft a solution. Groups of humans, when functioning as intended are commonly characterized as teams. Webster defines a 'team' as "a number of people working together on a common task"[1]. The literature refines this definition as follows: "A team is a small number of people with complementary skills who are committed to a common purpose, performance goals, and approach for which they hold themselves mutually accountable"[2].

[1]Webster's Encyclopedic Dictionary of the English Language, 1992; Lexicon Publications.

[2]The Wisdom of Teams; creating the high-performance organization; Jon R. Katzenbach, Douglas K. Smith; Harvard Business School Press, 1993 Boston Mass.

Although reliance by humans on group effort predates recorded history, a high performance team effort is a rare occurrence. This is because as the literature states, "Individuality and self preservation remain the rule, shared responsibility based on trusting others is the exception. A reluctance to take a risk and submit one's fate to the performance of a team, therefore, is almost inbred"[3]. When high performance teams do occur they have the following characteristics:

"Participative Leadership—create inter-dependency by empowering, serving others;

Shared Leadership—all members feel responsible for performance of work unit;

Aligned on Purpose—common purpose;

High Communication—trust, open honest communication;

Future Focused—change is opportunity;

Focused on Task—focus on results;

Creative Talents—applying individual talents and creativity;

Rapid Response—identifying and acting on opportunity."[4]

[3]The Wisdom of Teams; creating the high-performance organization; Jon R. Katzenbach, Douglas K. Smith; Harvard Business School Press, 1993 Boston, Mass.

[4]Creating the high-performance team; Steve Buchholz, Thomas Roth; Wiley, 1987.

Maximizing a team's efficiency requires that all members' actions add to team synergy. Given the natural reluctance to team orientation, only a supportive value/reward system can encourage team-oriented action. An old business adage comes into play, "you get what you 'inspect' not what you 'expect'". By this axiom a team member will be motivated to maximize his or her performance as measured, because the value/reward system is based on what is measured. When the team-member measurement criteria is not directly aligned with team goals, the value/reward system motivates team members to act in ways that are counter-productive to a team winning effort.

Team value/reward methods have not changed significantly since pre-historic times. There are two basic team value/reward methods. Either team members are valued for team membership, or team members are valued for their individual skills. In the first case, the hunting party that killed the saber-toothed tiger all shared its meat. In the second case, individual members of the hunting party who created the weapons, possessed the cunning to trap the prey, and demonstrated the bravery, strength and foot speed to accurately plunged the spear into the beast, were rewarded individually for their valued skills. However, neither of these methods, separately or in combination, measures or instills all of the high performance team characteristics listed above.

The deficiencies of these methods are as follows:

a) Provide no means to establish a direct cause/effect relationship between individual team-member actions or collaborations, and team goal achievement:
   - either, they value and measure team-members' individual accomplishments regardless of their effect on team achievement, which re-enforces the individual's self-centered focus instead of a focus on team results, i.e. reward excellence in spear-making and spear-throwing;
   - or, they value all team members for team achievement regardless of their contribution to team results, i.e. all share the saber-tooth tiger meat;

b) Provide no means to identify and expose for analysis and reward, the critical few team-member actions and collaborations that are causal to team achievement; provide no direction to team members on how to apply individual talents and creativity to the achievement of a common task;

c) Provide no means to establish a common understanding of the value of different roles played by team members and thereby enable all team members to be accountable for team performance; provide no mechanism that directly relates the value of different functional types of team-member actions, to the achievement of a team goal, i.e., provide no means to compare the relative importance of making the deadly weapon, to creating the deadly trap, or to killing the beast;

d) Provide no means for a group to integrate its activities in pursuit of a group goal, when given only partial knowledge of how to achieve it; furthermore, provides no means for valuing and measuring collaborations between two or more team members, that directly result in team goal achievement i.e. provide no means to determine the spear-thrower/trap-layer collaborations which have the best chance of achieving a kill;

e) Provide no means to encourage trust or open, honest communications to enable a team to rapidly identify and act on opportunities; i.e. provide no protocol for interaction between spear-throwers and trap-layers to enable them to rapidly identify and act on opportunities and thereby increase the chance of a kill; provide no method or mechanism to fairly and objectively measure and record team-member activities;

SUMMARY

This invention defines a method and performance feedback system to enable group members to interact quickly and efficiently with their peers to craft a solution to a group goal without external intervention. Using the common understanding provided by this performance feedback system, team members effectively collaborate to achieve a common goal while possessing only partial understanding of how to achieve it. This method and system enables the group to progress towards its common goal by incorporating internal creativity and group intuition as modes of behavior, rather than internal conflict and internal competition.

The present invention achieves the following desirable features:

a) means to provide understanding of individual team-members' performance by exposing the direct cause/effect relationship between individual team-member actions and team goal achievement; thus enabling team members to adjust their actions and inter-actions with other team members, to enhance future team performance; furthermore, the values and measurements produced using this method and system can be used to gratify the team-members' individual needs in direct proportion to their measured value to team achievement; furthermore, this fair reward and recognition for effective team activity works to reduce team-members' conflict between the natural tendency toward individuality and self-preservation, and the counter-intuitive human contrivance of team orientation;

b) means to expose for analysis and reward, the critical few team-member actions and collaborations that are causal to team achievement; furthermore, this invention only values individual team-member actions that are part of an action sequence that directly results in the achievement of a valued team goal; examples from past successes enable team members to learn how to apply individual talents and creativity to improve future team performance;

c) means to compare the values of different functional roles team-members play when contributing to team achievement, and to enable all team members to be accountable for team performance; a method and system that directly relate the value of different functional types of team-member actions, to the achievement of a team goal;

d) means to guide team members on how to integrate their activities in pursuit of a group goal, when given only partial understanding of how they can achieve it; furthermore, a means for valuing and measuring collaborations between two or more team members, that directly result in team goal achievement; furthermore, a common team-member interaction protocol that stimulates the development of quick and efficient teammate inter-creativity and group intuition;

e) trusted performance feedback method and system to promote open, honest communication among team members and thereby enable them to rapidly identify and act on opportunities; this method and system fairly and objectively measure and record valued team-members actions and collaborations and sums, compares, stores and publishes the values of these actions and collaborations.

These improvements are accomplished by the present invention by providing the following abstract objects, which are shown in FIG. 1:

1. process flow abstraction called COMPETITIVE ENVIRONMENT that represents a domain with a set of rules and conditions that determines the team-member actions which are Contested and which are Uncontested, and determines the relative value of functionally different team-member actions, thereby influencing the activity which team-members employ while contesting to achieve a team goal.

2. process flow abstraction called CONTEST that represents a discrete event within a COMPETITIVE ENVIRONMENT during which one or more teams strive to achieve a common goal within a predetermined amount of time.

3. process flow abstraction called POSSESSION that represents a unique pursuit of a team goal, beginning with the successful acquisition of the resources required to achieve that goal, and proceeding with the enhancement of those resources by stages until the team goal is achieved, the resources are lost, or the CONTEST duration is exceeded.

4. process flow abstraction called TEAM ACHIEVEMENT VALUE that represents the result of a team's pursuit of its goal during a POSSESSION or CONTEST, and having the value 1=achievement (win), or 0=non-achievement (loss).

5. process flow abstraction shown in FIG. 2, called ACT SEQUENCE that represents the critical few team-member actions and their sequence, that are causal to TEAM ACHIEVEMENT VALUE=1. The ACT SEQUENCE is comprised of three discrete sequential stages; first an ACQUIRING ACTION that acquires control of resources prerequisite to attain TEAM ACHIEVEMENT VALUE=1; followed by a CREATING ACTION that removes variable obstacles creating an uncontested TESTING ACTION; followed by a TESTING ACTION that eliminates the fixed obstacles to attain TEAM ACHIEVEMENT VALUE=1. An ACT SEQUENCE with one or more completed stages is called a POSSESSION. The ACT SEQUENCE, or POSSESSION is successful if it results in TEAM ACHIEVEMENT VALUE=1. Moving directly through the ACT SEQUENCE maximizes team efficiency. Therefore, to focus team members' efforts on team achievement rather than on performing isolated actions, this invention stipulates that only the last A, C and T Stage actions or collaborations are valued for every successful ACT SEQUENCE.

6. process flow abstraction called JUDGE, representing an expert human or artificially intelligent decision-making entity, that monitors a CONTEST and identifies and selects valued team-member actions and collaborations within the context of the TEAM-MEMBER INTERACTION PROTOCOL (TIP) shown in FIG. 3.

7. process flow abstraction called TEAM-MEMBER INTERACTION PROTOCOL that governs team-member interaction during a CONTEST. The protocol stipulates low priority two-way peer-to-peer communication among all PLAYERS and overlays a higher priority star topology two-way communication which places the empowered PLAYER with the role as STEWARD at the center of the star. The Steward's communications have highest priority.

8. process flow abstraction within the TEAM-MEMBER INTERACTION PROTOCOL called PLAYER that represents a team member who performs actions and interacts with other team members in pursuit of a team goal.

9. process flow abstraction within the TEAM-MEMBER INTERACTION PROTOCOL called STEWARD which represents a role taken on by a PLAYER that empowers that PLAYER to protect team resources and advance a POSSESSION to the next stage in the ACT Sequence.

10. unit of measure called TEAMSHARE that represents one team member's share of the reward for a successful POSSESSION or CONTEST. TEAMSHARE is calculated as the aggregate of an individual team member's ACQUIRING ACTIONs, CREATING ACTIONs and TESTING ACTIONs that are part of successful ACT SEQUENCEs. The aggregate of all team-members' TEAMSHAREs is equal to the total reward value attributed to a team. TEAMSHARE serves as the common currency for comparison of different team members' contributions to TEAM ACHIEVEMENT VALUE=1.

In addition, the present invention provides the following mechanisms also shown in FIG. 4 and FIG. 14:

1. A mechanism called Acton-Type Valuing Mechanism 100 for determining the statistical correlation of functionally different team-member action-types, to TEAM ACHIEVEMENT VALUE. This mechanism is comprised of a method and collection of co-operating software programs executing on one computer or plural computers on a network, that process a sample of CONTEST data to produce a table of valued team-member action-types with associated value coefficients for a particular COMPETITIVE ENVIRONMENT.

2. A mechanism called Action Scoring Mechanism 300 for determining and assigning a POSSESSION's reward value to the contributing team members for their valued actions. This mechanism is comprised of a method and collection of co-operating software programs executing on one computer or plural computers on a network, that use POSSESSION data received from a Action Selection Mechanism, and Action-Type/Value Coefficient data from the Acton-Type Valuing Mechanism as inputs, to produce as output a collection of team members with their associated Teamshares.

3. A mechanism called Action Selection Mechanism 200 for identifying, selecting, collecting and validating pertinent CONTEST data, and utilizing the services of an expert JUDGE to monitor the CONTEST. JUDGEs use the context of the TEAM-MEMBER INTERACTION PROTOCOL to help them focus attention on high potential team-member activity, enabling them to rapidly identify valued team-member actions and collaborations. This mechanism is comprised of a method and collection of software programs executing on one computer or plural computers on a network, and one or more JUDGEs who input the data.

4. A Performance Feedback Mechanism shown in FIG. 4, that collects CONTEST data and controls and interacts with the Acton-Type Valuing Mechanism, Action Scoring Mechanism, Action Selection Mechanism, database and Internet server to calculate team-members' TEAM SHAREs, and stores and publishes the resulting information.

5. Observer Mechanism shown in FIG. 14 that performs the JUDGE role, for a team of artificially intelligent machines or computer PLAYERs. This mechanism consists of neural network software programs called Observers that monitor the communication patterns and data-transfers between PLAYERs in the context of the TIP. This mechanism, through its self-learning neural networks, identifies potentially valuable sequences of activity for scrutiny by the Action Selection Mechanism without requiring all alternatives to be explored. This mechanized judging function enables a group of artificially intelligent machines or computers to self-manage their interactions while they craft a solution to a group goal given only partial knowledge of how to achieve it.

Those and other improvements are set forth in the following detailed description. For a better understanding of the present invention with advantages and features, refer to the description and to the drawings.

DETAILED DESCRIPTION OF THE INVENTION

Basic Structure of a Preferred Embodiment of the Invention In a preferred embodiment of the present invention, the team-member Performance Feedback System 500 is a collection of co-operating computer programs executing on one computer or plural computers connected by a network, as shown in FIG. 4. This particular implementation of the invention utilizes standard Microsoft Windows application programs called SPSS Base 8.0, SPSS Professional Statistics 8.0 and SPSS Advanced Statistics 8.0 and IBM DB2 database to perform standard statistical calculations and to store information on the computer. The computer programs that implement work flow are implemented as Java objects in the form of Java Servlets, Java Beans, Enterprise Java Beans and Java Server Pages. Statistical calculations are performed using SPSS Corporation's Correlation Analysis and Logistic Regression Analysis programs. Standard Internet protocols, languages and browsers are employed to implement the user interface. However, any general-purpose message passing mechanism and programming language is sufficient to implement the features of the present invention. For the purposes of teaching this invention, the following description of a preferred embodiment uses the general concepts of messages and entities, instead of object-oriented terminology.

Action-Type Valuing Mechanism 100

The Action-Type Valuing Mechanism shown in FIG. 5 establishes which team-member action-types are valued. It also classifies each valued action-type by ACT Sequence Stage and then calculates the relative value of each of these action-types by creating a Value Coefficient for each ACT Sequence Stage. The Action-Type/Value Coefficient relation produced by this mechanism is a required part of the definition of a COMPETITIVE ENVIRONMENT and must be established prior to the operation of the team-member Performance Feedback System.

Step 1: Action-Type Definition 110

A statistically significant sample of CONTEST data is input into the Action-Type Valuing Mechanism. This input data includes the number of occurrences of each Action-Type and the value of TEAM ACHIEVEMENT VALUE (1 or 0) for the CONTEST. Action-Type Definition is accomplished by subjecting these CONTEST data to SPSS Corporation's Correlation Analysis Program. Action-Types with a significant correlation to TEAM ACHIEVEMENT VALUE=1 are selected as Valued Action-Types. The output of the Action Definition Step is the Action-Type Value entity with the following attributes added: COMPETITIVE ENVIRONMENT, Qualified Action-Type.

Step 2: Classification of Action-type by ACT Sequence Stage 120

Qualified Action-Types from Step 1 are classified by ACT Sequence Stage according to the following criteria:

1. ACQUIRING ACTION acquires resources necessary for TEAM ACHIEVEMENT VALUE=1
2. CREATING ACTION removes variable obstacles, thus enabling an uncontested TESTING ACTION.
3. TESTING ACTION eliminates the fixed obstacles to attain TEAM ACHIEVEMENT VALUE=1

The output of Step 2 is the Action-Type Value entity with the following attribute added: ACT Sequence Stage.

Step 3: ACT Sequence Stage Efficiency Definition 130

Qualified Action-Types for the COMPETITIVE ENVIRONMENT from step 2 are inserted in the following general equations as source variables:

1. ACQUIRING ACTION EFFICIENCY for a CONTEST equals the sum of My Team's Contested ACQUIRING ACTIONs divided by the sum of the CONTEST's Total ACQUIRING ACTION opportunities,
2. CREATING ACTION EFFICIENCY for a CONTEST equals the sum of My Team's Uncontested TESTING ACTIONs divided by the sum of My Team's Total POSSESSIONs,
3. TESTING ACTION EFFICIENCY for a CONTEST equals the sum of the Values of My Team's TESTING ACTIONs divided by the sum of the Potential Values of My Team's Testing Action Opportunities.

These ACT Sequence Stage Efficiency equations may be optionally tested using the sample CONTEST data input in step 1, using SPSS Corporation's Correlation Analysis Program. This test insures that the ACT Sequence Stage Efficiencies have a low correlation with each other and a low correlation with any of their source variables. Low correlation indicates that the ACT Sequence Stage Efficiencies are independent of one another and not merely a composite of the source variables, thereby qualifying the ACT Sequence Stage Efficiencies as independent variables for a mathematical model of TEAM ACHIEVEMENT VALUE.

The outputs of the ACT Efficiency Definition Step 3 are definitions for ACQUIRING ACTION EFFICIENCY, CREATING ACTION EFFICIENCY and TESTING ACTION EFFICIENCY in terms of the Qualified Action-Types for the COMPETITIVE ENVIRONMENT specified in Steps 1 and 2.

Step 4: ACT Sequence Stage Valuing 140

Action-types classified in different ACT Sequence Stages may have different impacts on TEAM ACHIEVEMENT VALUE. This impact is determined as follows. A Logistic Regression Analysis software program is used to calculate a Logistic Regression Model with TEAM ACHIEVEMENT VALUE as the dichotomous (1 or 0) dependent variable and the ACT Sequence Stage Efficiencies as independent variables. Inputs for this Step are the sample CONTEST data input into Step 1, the Action-Types and ACT Sequence Stage outputs of Step 2, and the ACT Sequence Stage Efficiency definitions from step 3. Step 4 produces a mathematical model of the cause/effect relationship between team-member actions and TEAM ACHIEVEMENT VALUE including a constant coefficient associated with each ACT Sequence Stage Efficiency term. The resulting mathematical model equation follows:

> TEAM ACHIEVEMENT VALUE equals the constant a, plus the Value Coefficient b times the ACQUIRING ACTION EFFICIENCY, plus the Value Coefficient c times the CREATING ACTION EFFICIENCY, plus the Value Coefficient d times the TESTING ACTION EFFICIENCY.

TEAM ACHHIEVEMENT VALUE can have values 1=achievement, 0=non-achievement. The three Value Coefficients, b, c, d indicate the value of an action-type from one ACT Sequence Stage relative to the value of an action-type from one of the other two ACT Sequence Stages in the same COMPETITIVE ENVIRONMENT. The output of Step 4 is the Action-Type Value entity with the following attribute added: Value Coefficient Action Selection Mechanism 200

The Action Selection Mechanism shown in FIG. 6, functions to reveal the critical few team-member actions and collaborations that directly contribute to TEAM ACHIEVEMENT VALUE=1, from the complete set of actions that comprise a CONTEST. This invention requires judgement and experience to select and record all appropriate team-member actions for assignment of value. JUDGES perform this function. The effectiveness of this invention rests on the consistent, objective interpretation of team activities by the JUDGES. During a CONTEST many actions are occurring simultaneously. It is the responsibility of the JUDGE to focus on the potentially valuable action sequences so that all action sequences do not have to be scrutinized. The JUDGE, whether human or artificially intelligent software program, utilizes the TEAM-MEMBER INTERACTION PROTOCOL (TIP) as an aid to focus its attention on potentially valuable action sequences. The TIP is also embodied in the Action Selection Validation software program to validate the required flow of the ACT Sequence shown in FIG. 2 and the validation of selected collaborative actions. From these sequences, the JUDGE selects valued actions in compliance with the following validation rules that are implemented in the Data Validation software program 220 executing on a computer used to collect CONTEST data:

1. Only team-member actions, whose action-type is defined in the output of Step 1 of the Action-Type Valuing Mechanism, are valued.
2. Only the final action or collaboration in each stage of an ACT Sequence is valued. The flow of action must move sequentially forward from ACQUIRING ACTION to CREATING ACTION to TESTING ACTION. If the flow takes a step back before moving forward again, the most recent action or collaboration in an ACT Sequence Stage is valued and the prior action or collaboration is discarded.
3. An ACT Sequence requires only a TESTING ACTION. In this case, the TESTING ACTION accrues the value for the CREATING ACTION as well.
4. ACQUIRING ACTIONs that are uncontested are not valued. TESTING ACTIONS that result from testing opportunities awarded due to violations of the rules of the COMPETITIEVE ENVIRONMENT are valued.

ACT Sequence selections made by the JUDGE are validated by the Action Selection Mechanism prior to the passing of data to the Action Scoring Mechanism. The number of JUDGES required varies by COMPETITIVE ENVIRONMENT and depends on the level of activity detail that must be scrutinized. To aid a human JUDGE in collecting CONTEST data while simultaneously judging the CONTEST, the Action Selection Mechanism includes a data entry software program that enables the human JUDGE to select from menus of pre-programmed options instead of entering raw data while judging the CONTEST. The output of the Action Selection Mechanism is a POSSESSION entity with the following attributes added:

ACT Sequence, ACT Sequence Stage, Actions, Team Members

The Action Selection Mechanism optionally includes the following Data Collection Apparatus shown in FIG. 7, to enable human JUDGES to accurately capture data in "real time" situations that require the observation of fast moving team activity. These machine functions facilitate capture and validation of data:

1) Voice recognition software program and head-mounted microphone 410 are used by the JUDGE to facilitate data collection. They enable predefined audible commands to be recognized as computer commands during data capture. A pre-programmed set of audible selections enable the JUDGE to capture CONTEST data by voice commands.
2) A miniature head-mounted video screen 420 in the JUDGE's field of view, displays the current state of the data collection process, and enables her to see a current menu of computer command selections from which she can audibly select computer commands by using the voice recognition apparatus described above. This enables the JUDGE to validate that her computer commands are being processed as intended without significantly diverting her attention away from observing the CONTEST.

Action Scoring Mechanism 300

The Action Scoring Mechanism shown in FIG. 8 distributes the reward value of an ACT Sequence among the contributing team-members.

Step 1: Determine Active ACT Sequence Stages 310

ACT Sequence data from the Action Selection Mechanism is used as input to the Action Scoring Mechanism. The ACT Sequence data is scanned to determine which of its ACT Sequence Stage values are not null, meaning that they contributed to the ACT Sequence's success. If the ACQUIRNG ACTION stage value is not null, it is Active, meaning that an ACQUIRING ACTION contributed to the ACT Sequence's success. Consequently, it qualifies as a contested action and should receive a share of the ACT Sequence reward. The ACT Sequence data is then scanned to determine if the CREATING ACTION stage is not null, indicating that it is Active and qualifies as a contested action and should receive a share of the ACT Sequence reward. If the CREATING ACTION is null then the team-member performing the TESTING ACTION receives the CREATING ACTION's share of the reward also since the TESTING ACTION was accomplished without the benefit of being uncontested. The output of this stage is an Action Scoring Value entity with the following attributes added: ACT Sequence Stage, Stage Active (true or false).

Step 2: Reward Active ACT Sequence Stages 320

Each of the Active Stages in the ACT Sequence shares the ACT Sequence's reward. Input to Step 2 consists of the output from Step 1, and the ACT Sequence Reward included in the input to Step 1 and the output of the Action Valuing Mechanism. The ACT Sequence Stage Sharing Factor for an Active Stage is calculated by the following equations using the Value Coefficients obtained from the Action-Type Valuing Mechanism:

1. Acquiring Stage Sharing Factor equals Value Coefficient b divided by the sum of Value Coefficients b, and c, and d.
2. Creating Stage Sharing Factor equals Value Coefficient c divided by the sum of Value Coefficients b, and c, and d.
3. Testing Stage Sharing Factor equals Value Coefficient d divided by the sum of Value Coefficients b, and c, and d.

If a Stage is inactive, its corresponding Value Coefficient is zero in the above Sharing Factor equations. The reward for each Active Stage is calculated by multiplying the ACT Sequence Reward value by the Sharing Factor for the Active Stage. The output of Step 2 is the Action Scoring Value entity with the following attribute added: ACT Sequence Stage Reward Step 3: Identify Contributing Team Members 330

The reward sharing process continues by identifying the one or more team members who performed the action or collaboration that contributed to each Active Stage. They will share the Stage Reward equally. Input to Step 3 is the output from Step 2 and the input to Step 1. The output of Step 3 is an Action Scoring Value entity with the following attributes added: Team-Members, Action-Types.

Step 4: Share Active ACT Sequence Stage Reward 430

The Stage Reward is shared with the one or more team members who performed the actions and collaborations that contributed to each Active Stage. Input to Step 4 is the output of Step 3. When collaboration occurs, the Stage Reward is divided equally among the actions associated with that Stage. The resulting TEAMSHARE value is associated with each action. The output of Step 4 is an Action Scoring Value entity with the following attribute added: TEAMSHARE.

Performance Feedback Mechanism 510

The Performance Feedback Mechanism (PFM) implements the ACT Sequence Stage Valuing and Performance Feedback functionality of this invention. As shown in FIG. 10, the PFM acts as a controller for the Performance Feedback System (PFS) by controlling the interaction of the Action-Type Valuing Mechanism 100, and Action Selection Mechanism 200, and Action Scoring Mechanism 300, and the database and the Internet Server. Prior to the operation of the PFS, CONTEST data is input into the data collection software program in the Action Selection Mechanism 200. There it is formatted and validated and then passed to the Action-Type Valuing Mechanism 100 which adds ACT Sequence Stage Value Coefficients that are needed to complete the definition of the COMPETITIVE ENVIRONMENT. Once the PFS is operational, CONTEST data is input into the data collection software in the Action Selection Mechanism 200 where it is validated and composed into a POSSESSION entity and passed to the Action Scoring Mechanism 300 where the TEAMSHARE values are assigned. The Performance Feedback Mechanism calculates the TEAMSHARE on an aggregate basis and stores and retrieves it from the database.

The Performance Feedback Mechanism (PFM) 510 is implemented as a Java Servlet that executes on the Application Server computer shown in FIG. 9. It receives commands from the user interface via the Internet browser. User commands are input to the PFM via the Internet server. The Internet server forwards these commands using standard Internet protocols and languages. The PFM supplies the data and instructions to produce Java Server Pages, which are sent to the Internet server to respond to user requests. Web page caching may be used as an option to speed page delivery to the user.

PREFERRED EMBODIMENT

The present disclosure illustrates the invention as applied to the game and business of Basketball. It is presented for the purpose of illustration and is not intended to limit the invention to the specific embodiment illustrated. The invention is intended to cover all implementations within the scope of the appended claims.

Basketball Competitive Environment

Winning a Basketball game requires the cooperation of five players. A Basketball game or CONTEST has a predetermined goal—to score more points than the competing team in the prescribed amount of time. Equal access to resources (the Basketball) is mandated by rules that distribute the ball evenly between teams but also allow teams to contest for possession of the ball. The game tempo and changing team line-ups provide a constantly changing game environment. The Basketball COMPETITIVE ENVIRONMENT provides a setting for pure competition. In the Basketball COMPETITIVE ENVIRONMENT there is a winning and loosing team at the ACTION level, POSSESSION level and the CONTEST level. One team's success determines the other team's failure at all stages of the ACT Sequence. One team's ACQUIRING ACTION, CREATING ACTION or TESTING ACTION determines the other team's failure to acquire control of the basketball. The game is also interactive in that one team's strategy initiative can be counteracted by the other team's counter measures.

In the Basketball Competitive Environment, the ultimate goal—winning the game—requires a team to score more points than the opposing team. A team can only score points if it has possession of the Basketball. Since a game is the sum of its POSSESSIONs, acquiring and maintaining possession of the ball are the fundamental objectives of each POSSESSION. During a POSSESSION the goal of one team is to try to maintain control of the ball and score points while the goal of the competing team is to try to extend the time of the POSSESSION until it is successful in acquiring control of the ball. Each POSSESSION has a winning team and a losing team based on whether or not points are scored during that POSSESSION. The sum of the results of all POSSESSIONs determines the result of the CONTEST, or game. Basketball rules give uncontested possession of the ball to a team after certain events such as an opponent's Field Goal. In this case, acquiring the ball is not contested so it does not qualify as an ACQUIRING ACTION.

Performance Feedback System Operation

Figure 11:
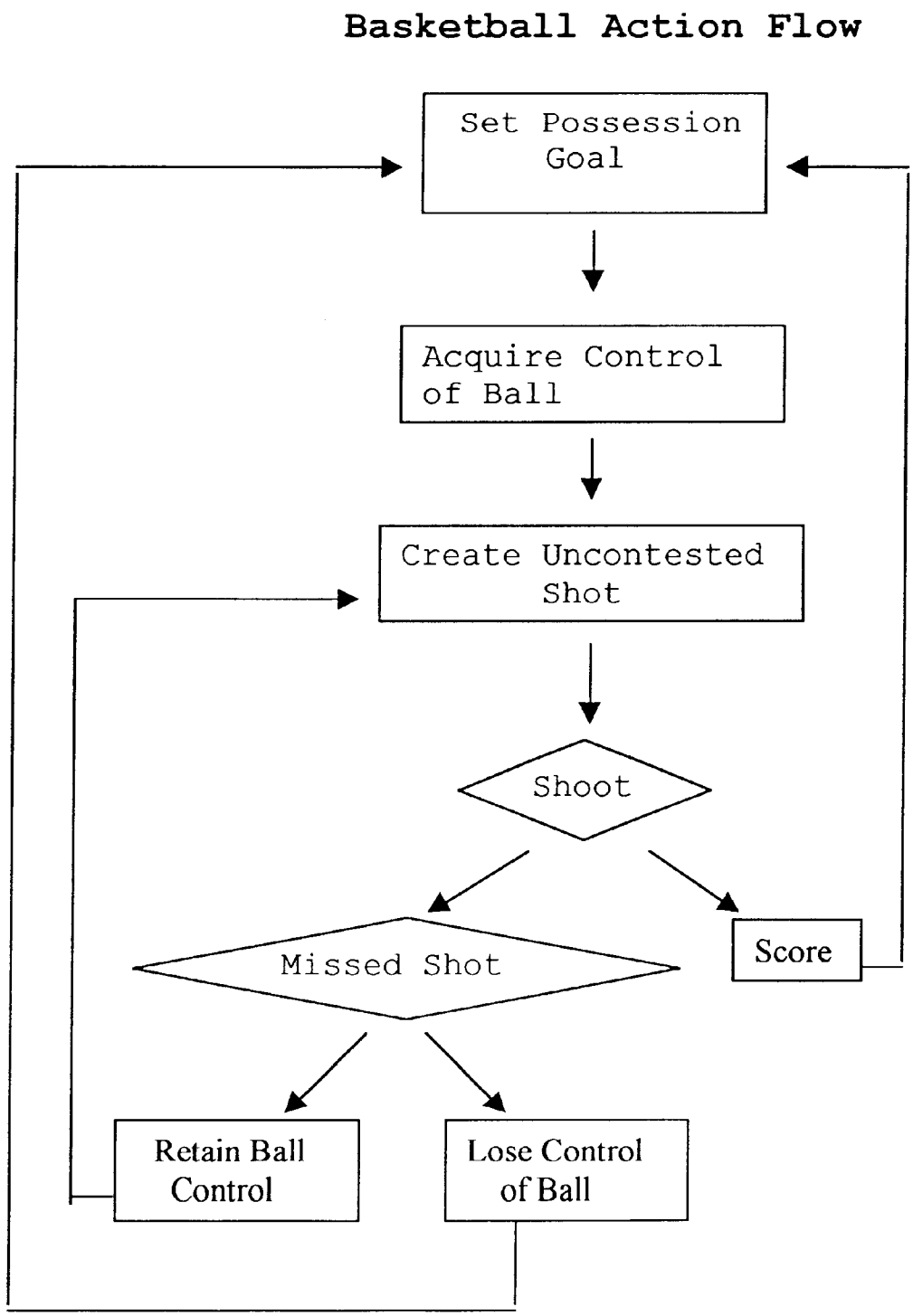
FIG. 11 shows the action sequence for Basketball.

A statistically significant sample of Basketball Game box score data is input into the Action-Type Valuing Mechanism. This data is used to define and classify the Basketball action-types. The first iteration of Basketball action-types is selected from the set of standard basketball units of measure found in standardized box scores. The action flow for Basketball, shown in FIG. 11 is based on the rules of Basketball. The ACT Sequence Stages are, acquiring control of the ball, then creating an uncontested shot and testing for success by shooting to score points. The classification of action-types by ACT Sequence Stage is as follows:

| ACQUIRING ACTIONS | CREATING ACTIONS | TESTING ACTIONS |
|---|---|---|
| Rebound | Assist | 1 Point Shot |
| Steal | Drawn Foul | 2 Point Shot |
| Forced Turnover | | 3 Point Shot. |
| Center Jump | | |

Figure 12:
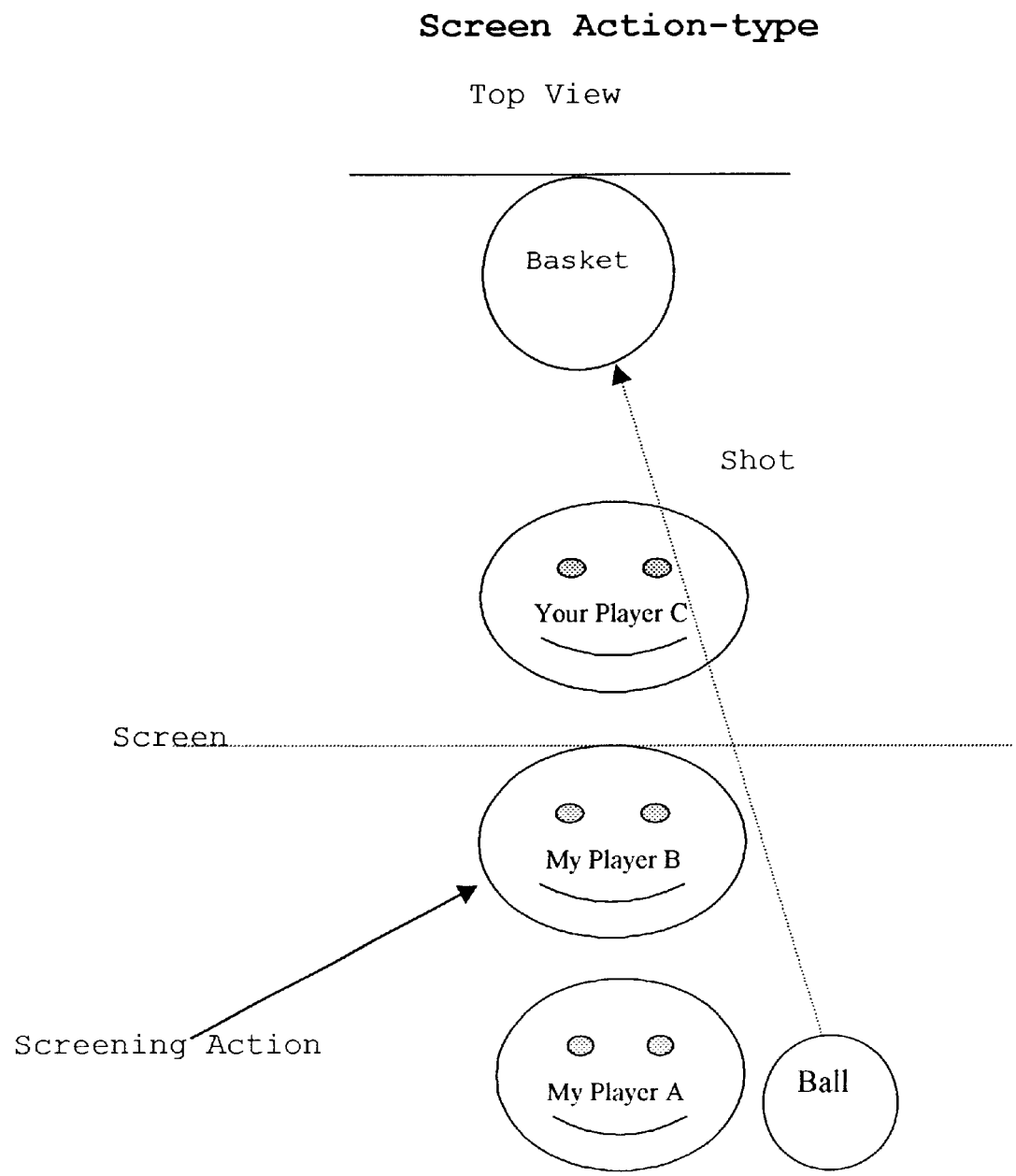
FIG. 12 demonstrates a potentially new Basketball action-type called "Screen".

In Basketball, as in any COMPETITIVE ENVIRONMENT, the action-types in ACT Sequence Stages can be replaced by more refined action-types and complemented by additional action-types, as the model of TEAM ACHIEVEMENT VALUE is refined. An example of a potential new action-type is "Screen". "My" and "Your" distinguish two competing teams in the definitions below. A successful "Screen" action shown in FIG. 12, occurs when My Player A and My Player B collaborate to prevent Your Player C from disrupting the shooting of My Player A. My Player B places his body as a screen between My Player A and Your Player C and prevents Your Player C from contesting or altering the shot of My Player A. If there is a high correlation between Screen actions and successful ACT Sequences, then Screen is added to the CREATING ACTION category as a valued action-type.

Once the ACT Sequence Stages have been populated with valued action-types, the ACT Sequence Stage Efficiency Definition begins. The ACQUIRING ACTION EFFICIENCY, CREATING ACTION EFFICIENCY and TESTING ACTION EFFICIENCY are defined in terms of the source variables for the Basketball COMPETITIVE ENVIRONMENT. The source variables may change as the TEAM ACHIEVEMENT VALUE model is refined. The definitions given below are only the beginning stage of a refinement process.

1. ACQUIRING ACTION EFFICIENCY equals the sum of My Total Rebounds and Your Turnovers and My Steals, divided by the sum of Total Contest Rebounds and Total Contest Turnovers and My Steals and Your Fouls.
2. CREATING ACTION EFFICIENCY equals the sum of My Assists and Your Fouls divided by the sum of My Rebounds and Your Turnovers and My Steals and Your 2 point Shots Made and Your 3 point Shots Made and Your Technical Fouls and 1.
3. TESTING ACTION EFFICIENCY equals the sum of My 1 point Shots Made, and My 2 point Shots Made times 2, and My 3 point Shots Made times 3, divided by the sum of My 1 point Shot Attempts and My 2 point Shot Attempts times 2, and My 3 point Shot Attempts times 3.

Next, the relative importance of the A, C and T stages is determined by using Logistic Regression Analysis methods applied to CONTEST data, to generate the TEAM ACHIEVEMENT VALUE model with the Basketball ACT Sequence Stage Value Coefficients. This completes the definition of the Basketball Competitive Environment. The team-member Performance Feedback System can now be made operational.

First, team members are taught the TIP protocol for interacting with one another that when adopted by all team members, establishes a common basis for effective communication and interaction among team members. This behavioral protocol provides a framework for developing quick and efficient teammate inter-creativity and group intuition. It replaces the rigid, pre-planned control of teammate interaction imposed by external management. Team members are motivated to follow TIP because it is the context in which their actions will be judged and validated by the Action Selection Mechanism.

Figure 7:
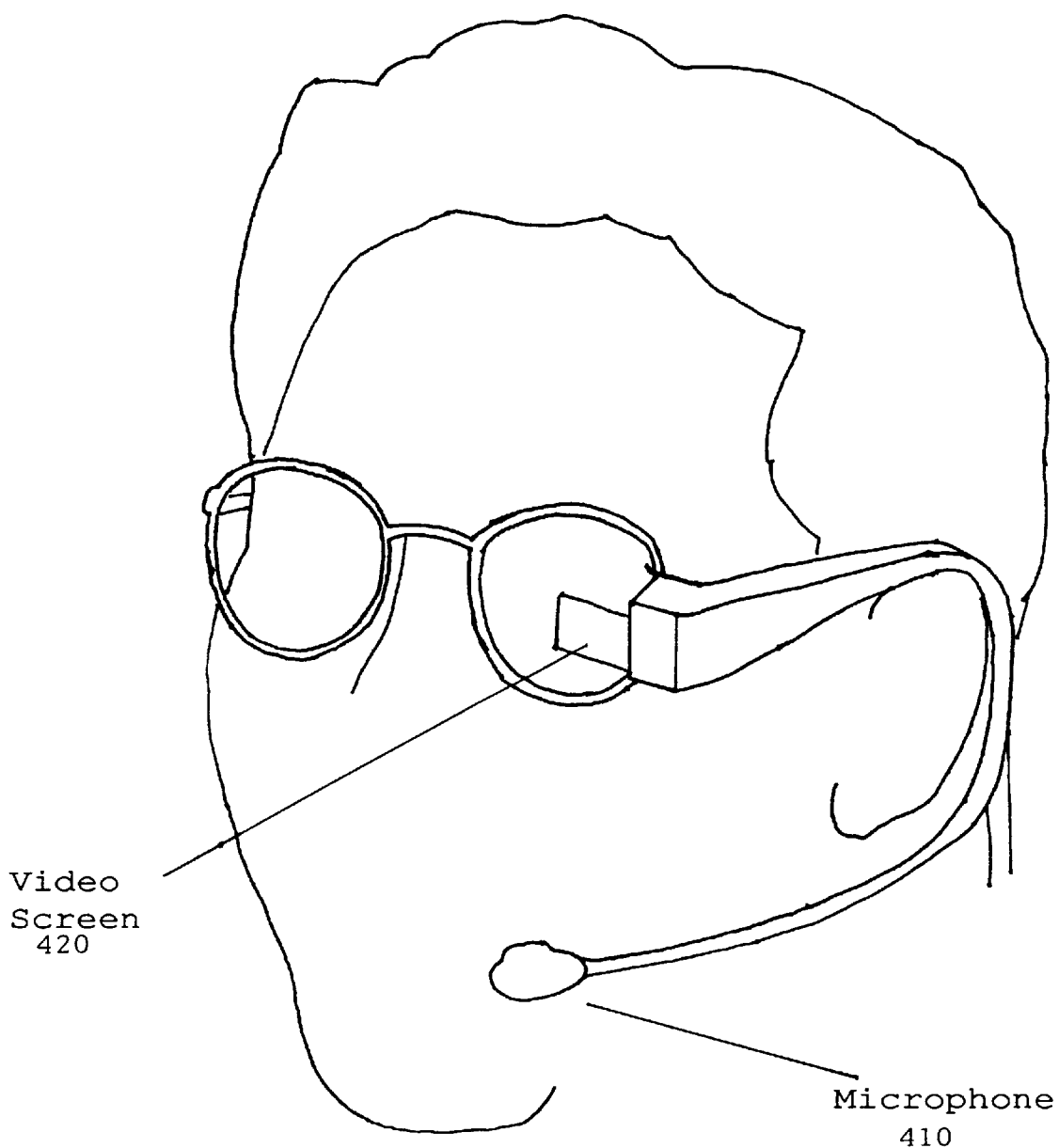
FIG. 7 shows the miniature head-mounted video display screen and head-mounted microphone used to facilitate a human JUDGE's data collection process.
Figure 8:
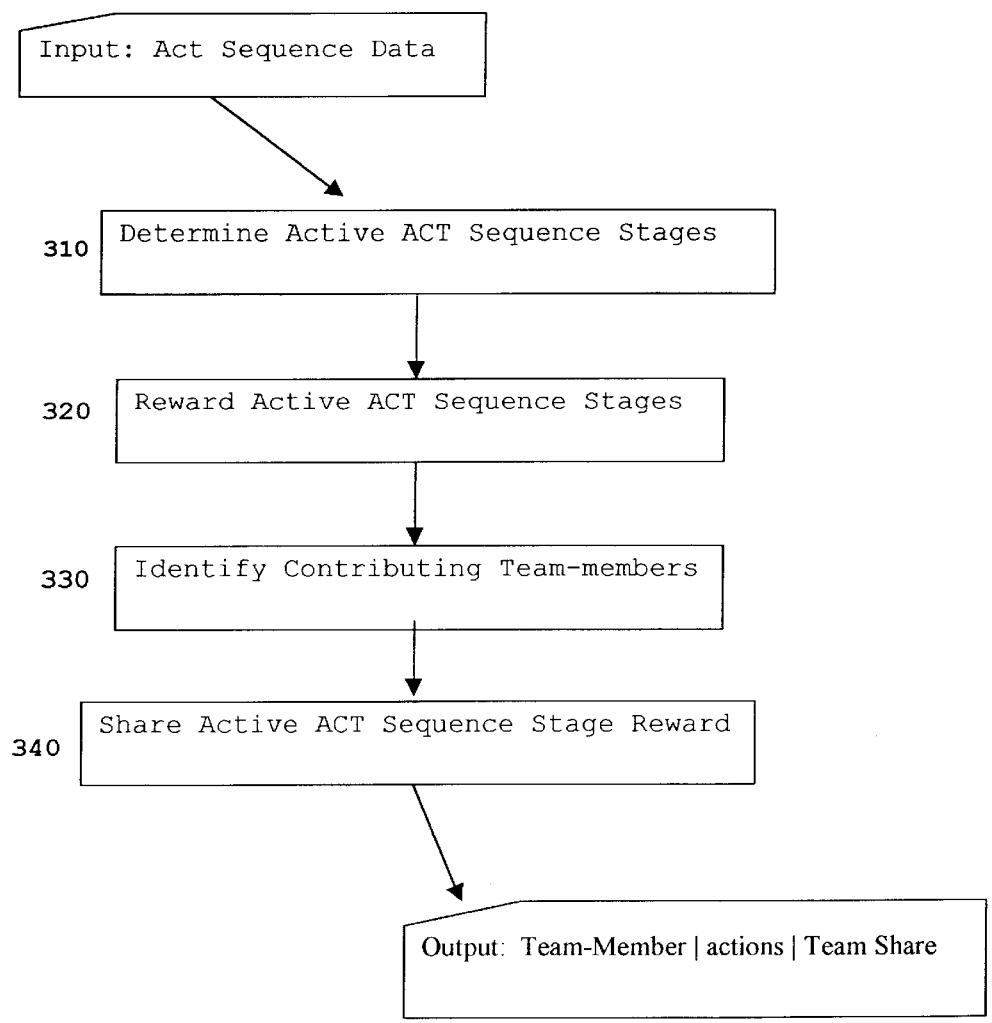
FIG. 8 shows the steps that comprise the Action Scoring Mechanism.

One of the characteristics of a basketball game is subtle fast-moving action. The Basketball COMPETITIVE ENVIRONMENT requires human judgement to select the critical few actions and collaborations to be rewarded. Human JUDGES must be trained to recognize these actions and collaborations. Human JUDGES observe the CONTEST in the context of the TIP that enables them to direct their focus to potentially valuable action sequences. They identify the ACT Sequence actors and their actions, record the beginning and end of a POSSESSION, record the results of each POSSESSION and record the time on the game-clock that players enter and leave the game. Prior to the game the human JUDGE records game-specific data, such as team names, date, location, team rosters, and officials' names using standard computer data-entry techniques. As the game progresses, the JUDGE may optionally use a head-mounted display to view the state of the data collection software program 210. The JUDGE may optionally convey his commands to the data collection software program using voice commands or mouse selections. A machine aid is a separate, optional tool, which may be used to facilitate the Action Selection process and increase its accuracy. This machine aid consists of software programs on a Local Computer, miniature head-mounted visual display and a head-mounted microphone as shown in FIG. 7. This apparatus can display the state of the data collection process and convey the JUDGE's voice commands to the voice recognition software program executing on the Local Computer. The voice recognition software program translates the voice commands into software commands recognized by the computer-resident Action Selection software. A tape recorder may be used as an alternative apparatus to collect game data, in cases where real-time game analysis is not necessary. A printed form can also be used as a manual data capture option. In these cases, the game data is transferred from tape or printed form, to the Action Selection software system at a later time using manual data entry. The Local Computer may also store the data for each POSSESSION in a local database before it is passed to the Action Scoring Mechanism.

Figure 13:
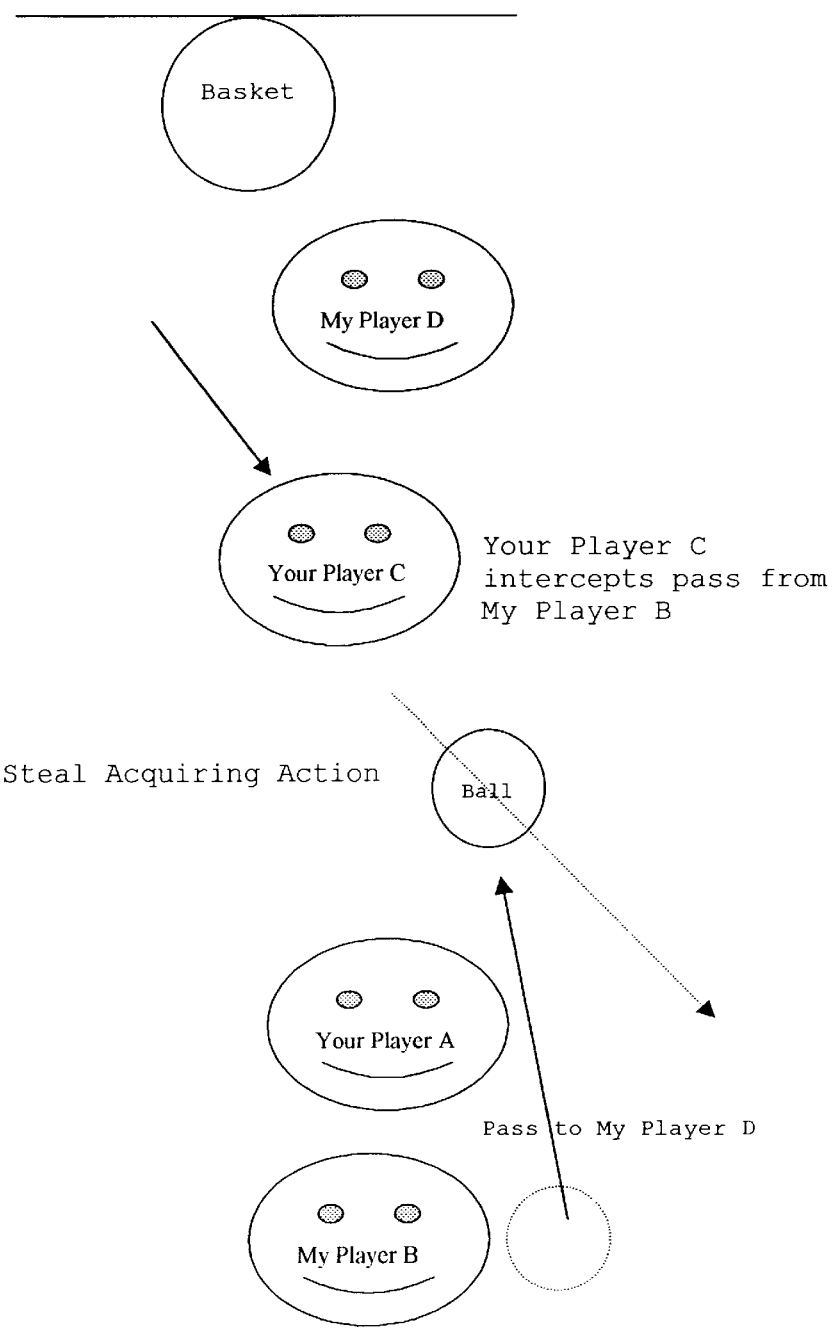
FIG. 13 demonstrates a Steal action-type scenario.

The Action Selection Process begins with the initiation of the first ACT sequence. This occurs when a member of one of the competing teams acquires control of the Basketball through an ACQUIRING ACTION such as, rebound, steal, forced turnover or center jump. This establishes the first POSSESSION of the game. The next valued action the JUDGE will be looking for in the context of the TIP will be a CREATING ACTION, such as, Assist or Drawn Foul. The last valued action will be a TESTING ACTION, such as shooting for 1, 2 or 3 points. If the shot does not result in points, then the POSSESSION ends and all ACT Sequence actions are discarded. If the shot does result in points, then each stage of the ACT Sequence shares the point value of the POSSESSION in proportion to the ACT Sequence Stage Sharing Factors calculated by the Action Scoring Mechanism 300. If the shot is not successful but a teammate gets the rebound then this ACQUIRING ACTION begins a new POSSESSION. Only the final ACQUIRING ACTION, CREATING ACTION and TESTING ACTION in a successful POSSESSION are valued. Both the action and the player performing the action are credited. An A, C or T action can be a collaboration composed of multiple players' individual actions. For example, as shown in FIG. 13, Your Player A is defending My Player B who has control of the basketball but is distant from the basket. Your Player C is defending My Player D who is close to the basket. Your Player A's tight defense causes My Player B to make a poor pass to My Player D and Your Player C steals the ball. The credit for this ACQUIRING ACTION is shared equally by Your Player A and Your Player C. The POSSESSION continues as Your Player C races undefended to his opponent's basket and scores two points. Your Player A and Your Player C share the CREATING ACTION credit and Your Player C receives credit for the scoring action. The reward value of the POSSESSION is two points and it is shared with the ACQUIRING ACTION, CREATING ACTION and TESTING ACTION players in proportion to the ACT Sequence Stage Sharing Factors. In the case of collaborative steal, the acting Players A and C share the CREATING ACTION Stage Reward equally. Your Player C also receives the TESTING ACTION Stage reward for his successful shot.

Figure 1:
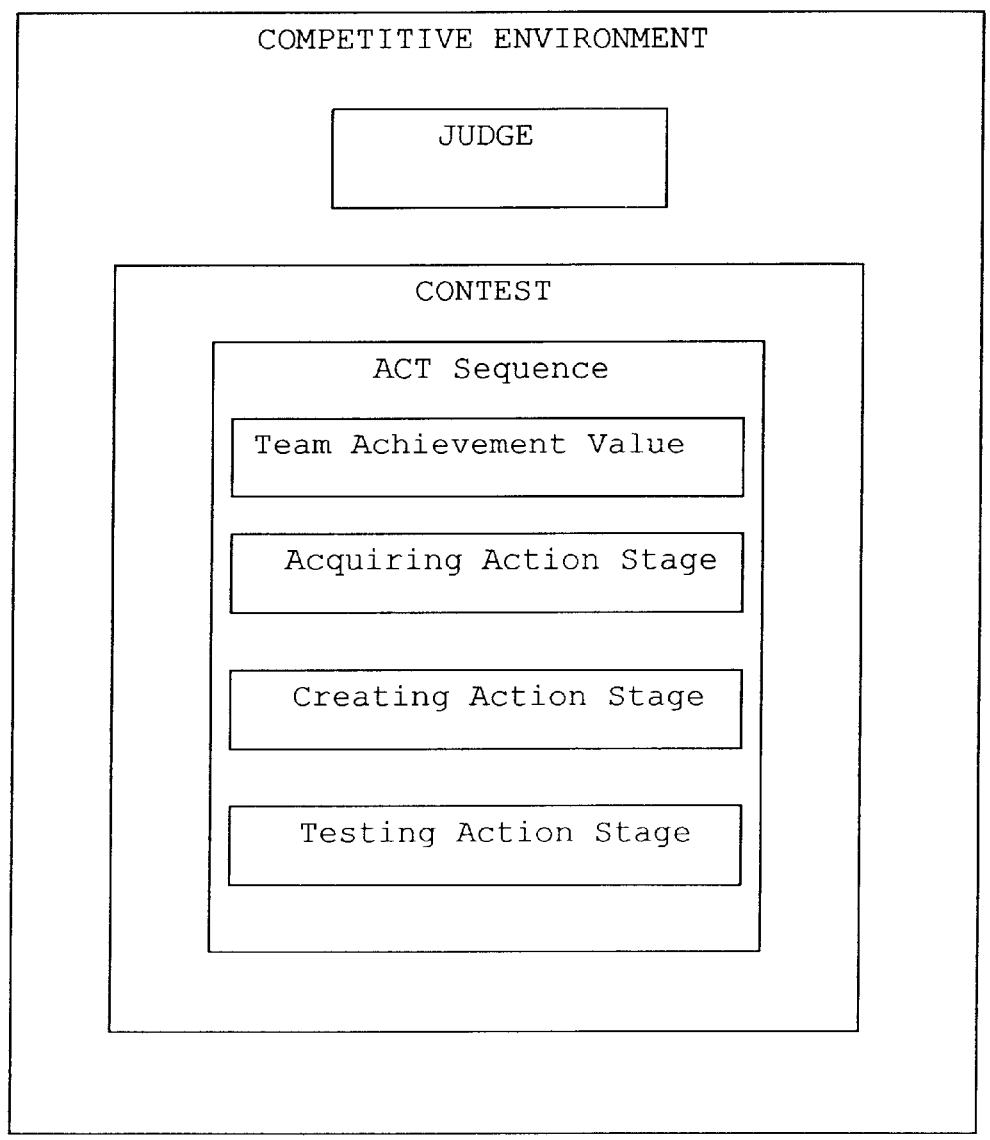
FIG. 1 shows the abstract objects and their relationships by containment.
Figure 2:
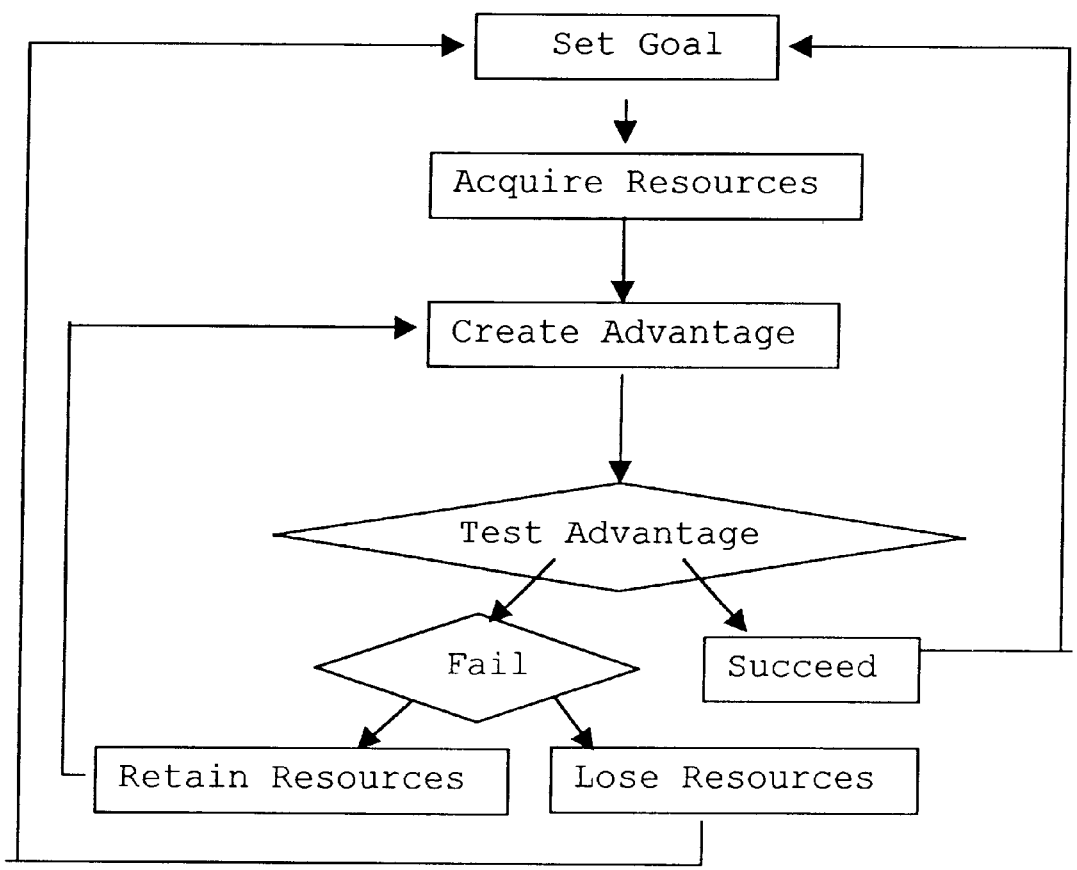
FIG. 2 shows the action sequence pursued by team members to achieve a team goal.
Figure 3:
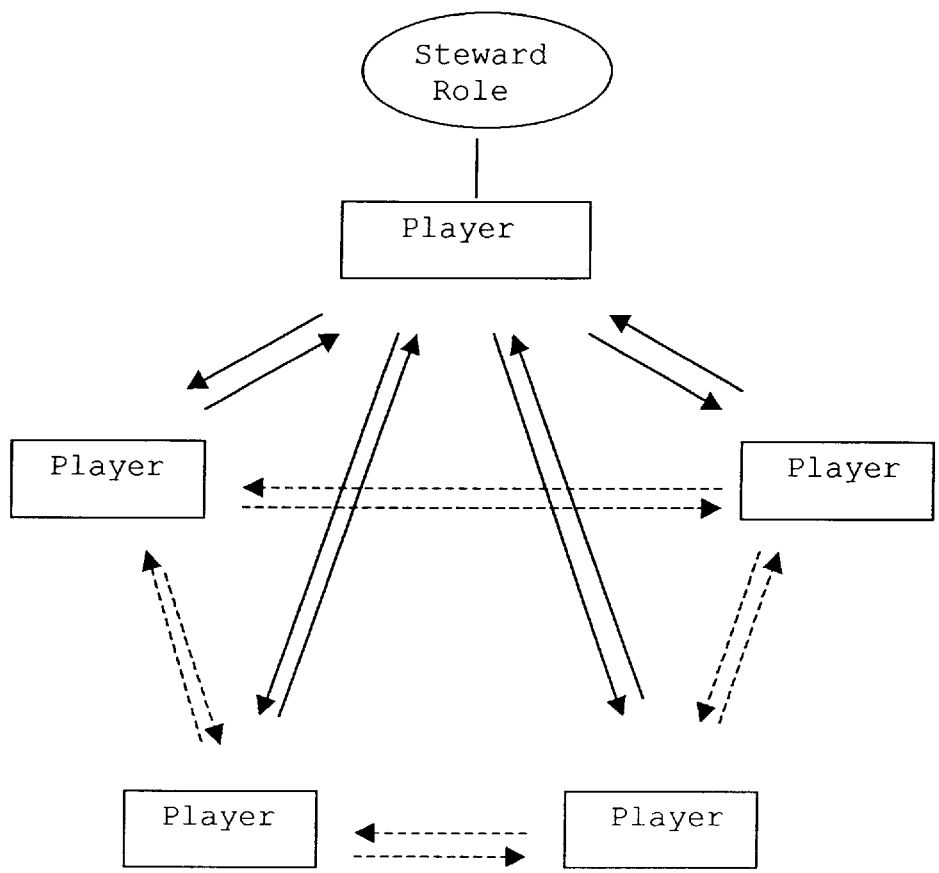
FIG. 3 shows the Team-member Interaction Protocol followed by team members while pursuing a team goal.
Figure 4:
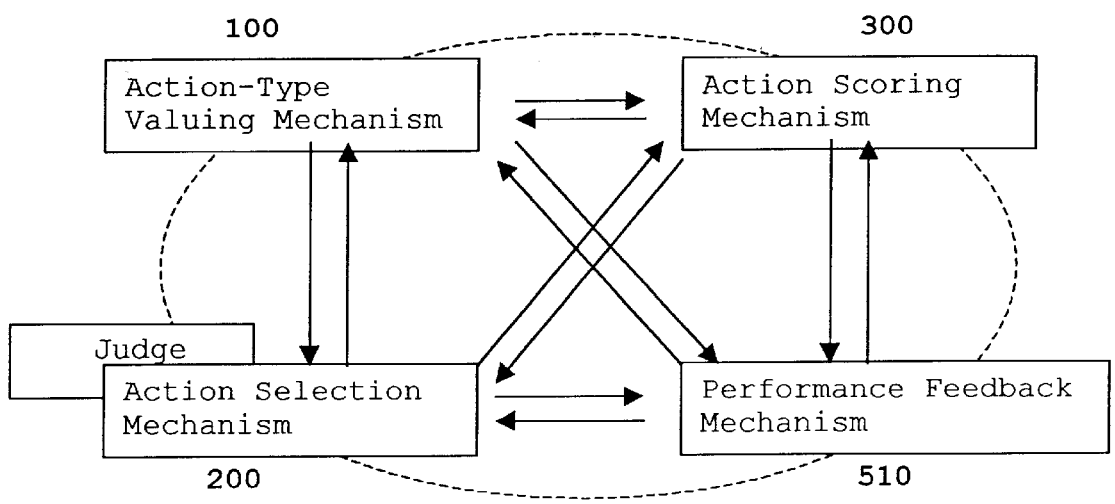
FIG. 4 shows the team-member Performance Feedback System components.
Figure 5:
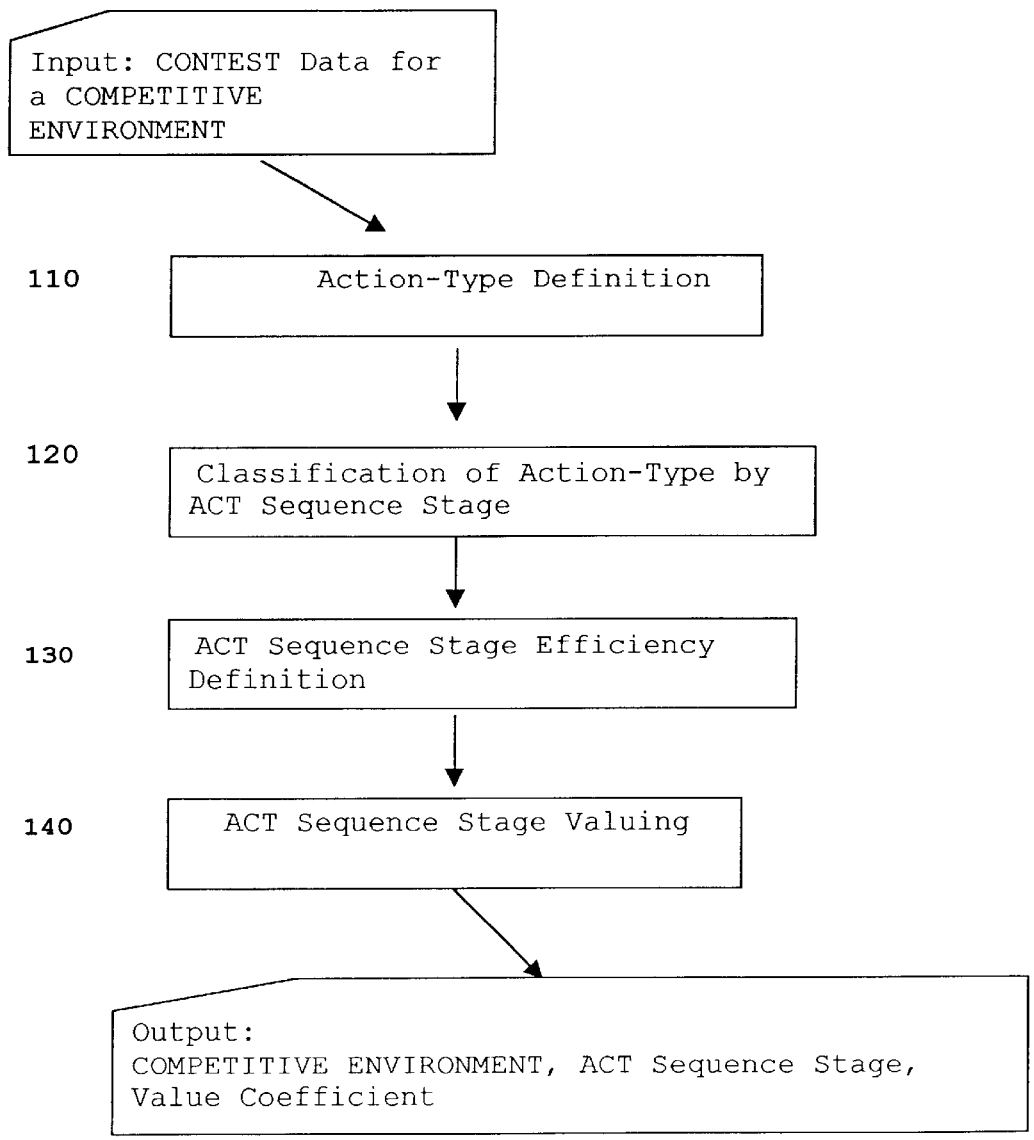
FIG. 5 shows the steps that comprise the Action Valuing Mechanism.
Figure 6:
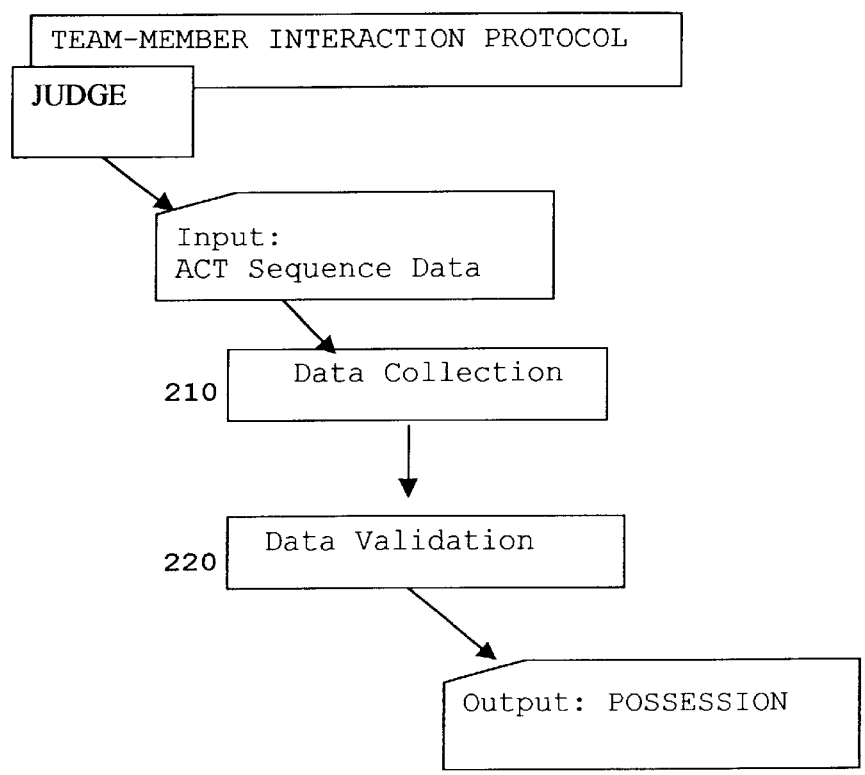
FIG. 6 shows the steps that comprise the Action Selection Mechanism.

The TEAM-MEMBER INTERACTION PROTOCOL (TIP) FIG. 3 functions as follows. Team members are motivated to act in harmony with the TIP protocol, which is the context used by the JUDGE and validated by the Action Selection software. When a team member acquires control of the ball by means of an ACQUIRING ACTION such as, rebound, steal, forced turnover or center jump, he becomes the STEWARD of the resource (basketball) and has earned a share of the potential reward associated with the success of the POSSESSION. The ball handler or STEWARD, becomes the team decision-maker empowered to lead the team forward through the ACT Sequence. Simultaneously, the STEWARD and all of his teammates try to envision action sequences that would remove the opponents' contention to scoring points. Since the STEWARD possesses control of the ball, he is the focus of the opposition and will encounter the greatest contention. The STEWARD is motivated to collaborate with other teammates, in order to realize his accrued potential reward. His teammates are motivated to share in the potential reward, by creating roles for themselves in the ACT Sequence.

When the STEWARD has added all the value he can, he is empowered to pass the ball to the teammate that he decides has the best chance of achieving the next step in the ACT Sequence. The STEWARD's teammates quickly and efficiently convey their vision through verbal and physical signals, as well as by their location and movement on the court. A teammate's vision may involve collaboration with yet another teammate besides the STEWARD. For example, a teammate may set a screen for another teammate to free him from his defender so that he can freely receive the ball from the STEWARD. In this case, the vision must be communicated and shared by both collaborating teammates. The STEWARD would likely sense the potential of this option and choose to pass the ball to the free teammate with this uncontested shooting opportunity.

In this case all three teammates would potentially share the reward for the CREATING ACTION of this POSSESSION. The STEWARD increases his chance of reward by moving the POSSESSION to the next stage, and both of his teammates share the potential reward for creating the uncontested shooting opportunity. If shooting is successful or a foul is drawn on the defender creating a free-throw, then the shooting teammate will receive a reward for the points scored and he, and the other ACT Sequence participants realize their accrued potential reward for the ACQUIRING ACTION and the CREATING ACTION. In ACT sequences where there is no ACQUIRING ACTION, the value of the POSSESSION is shared between CREATING ACTION and TESTING ACTION. If there is no identified CREATING ACTION, credit for the CREATING ACTION defaults to the TESTING ACTION.

Since multiple team members can share the reward for contributing to each of the "A", "C", or "T" stages in the sequence; team members are not strongly motivated to vie for the same role. They mutually accept the STEWARD's choice for the next PLAYER role to extend the ACT sequence, and plan ahead to assist with a supporting PLAYER role of their own making, that may be chosen for the next ACT Sequence stage. Multiple team members can share the reward for a collaborative role in a successful ACT sequence. The PLAYER and the supporting PLAYER are both motivated to be successful in their roles since they will share the reward for a successful POSSESSION; and their performance in the current POSSESSION will affect their acceptability for future roles on the team. This process is repeated until the team's goal is achieved or the resource is lost. This creates a familiarity and common expectation among team members, thereby reducing miscommunication and encouraging group intuition to rapidly identify and act on opportunities.

Figure 9:
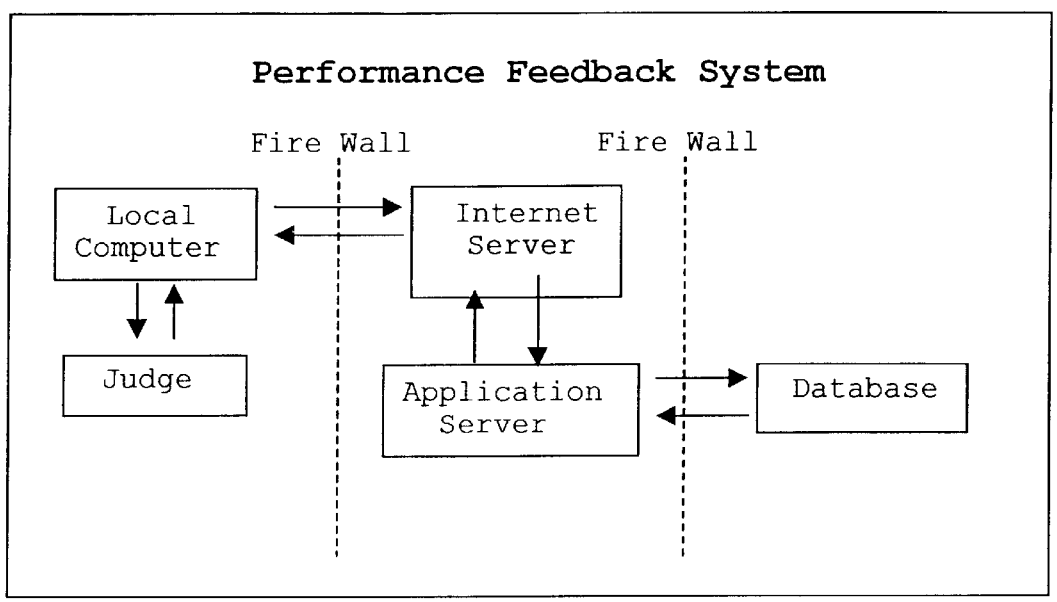
FIG. 9 shows the components that make up the team-member Performance Feedback System.
Figure 10:
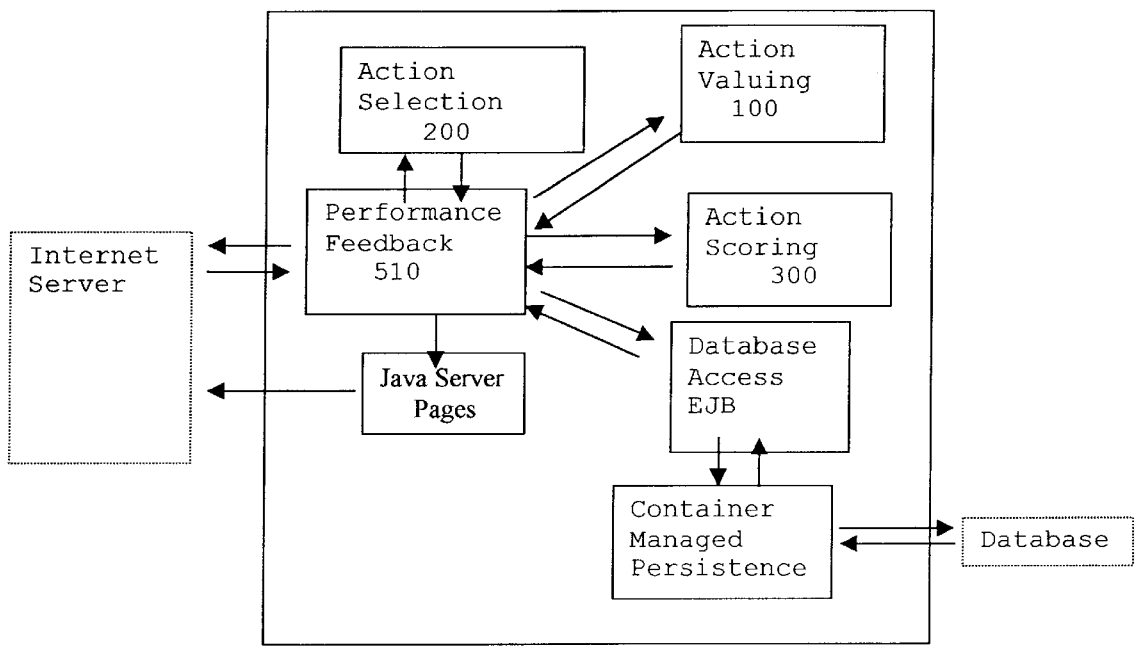
FIG. 10 shows the components that make up the Basketball Application Server.

As shown in FIG. 9, the Local Computer transfers the game data via the Internet through a protective Firewall to a central Internet Server that provides a secure interface to protect against unauthorized use. The Internet Server passes collected data to an Application Server. The Application Server processes POSSESSION data through the Action Scoring mechanism to calculate and assign each team-member's TEAMSHARE points for each POSSESSION and game, and passes the processed data through the firewall to the database for storage. TEAMSHARE is calculated as the sum of credits for an individual team member's ACQUIRING ACTIONs, CREATING ACTIONs and TESTING ACTIONs that are part of successful POSSESSIONs. The aggregate of all team-members' TEAMSHAREs equals the total number of points scored by a team. An Application Server, utilizing Performance Feedback mechanism, retrieves the stored data for a team member, team or game, and creates web pages containing this information and serves these web pages through the central Internet server. This data can be made available to coaches, players and fans as the game progresses. This exposure of successful actions and collaboration patterns can be emulated as the game continues. This requires rapid processing and publishing of collected data, which is accomplished by the Performance Feedback System. Summary data can be used to compare the performance of players on the same or different teams, as a basis for compensation or team formulation.

The collection of software programs that implement the Basketball Performance Feedback System is written in the Java programming language. However, other software languages and hardware configurations could also be used. The Local Computer is accessible through an Internet Browser user interface. The Action Selection Mechanism includes web pages that are downloaded via the Internet to the Local Computer. The Voice Recognition software is co-resident on the Local Computer. As shown in FIG. 9, the output of the Action Selection mechanism is telecommunicated over the Internet through a Firewall to an Internet server, which verifies authorization and then passes the data to a Performance Feedback Java Servlet resident on the Web Application Server. The Servlet utilizes the services of a Database Access Java Bean to initiate database access. It in turn requests the services of an Enterprise Java Bean to implement Container Managed Persistence to store the objects in the database. The same Database Access Java Bean provides similar services for retrieving objects from the database. An Action Scoring Java Servlet provides scoring services for Possession and Game data. Java Server Pages are used to dynamically create web pages containing customized data, upon request from the Client Browser. These web pages are served by the Internet Server to requesting Client Browsers.

Second Preferred Embodiment

Another preferred embodiment of this invention is the team-selling process. Unlike the Basketball COMPETITIVE ENVIRONMENT, in the Selling COMPETITIVE ENVIRONMENT, competition is pure only at the TESTING, or Close and Install stage. One team's ACQUIRING ACTION and CREATING ACTION does not preclude the possibility of similar successes by a competing team because prospect contact information and customer solutions can be simultaneously produced by multiple teams. Only the close and install determines the winning and losing teams. The selling team is comprised of members who perform the same, or compatible but functionally different tasks in the sales process. The ACT Sequence consists of, 'acquiring' contact information about potential customers, 'creating' a solution personalized to the customer's need and handling customer objections, and 'testing' to close and install the solution.

Third Preferred Embodiment

Figure 14:
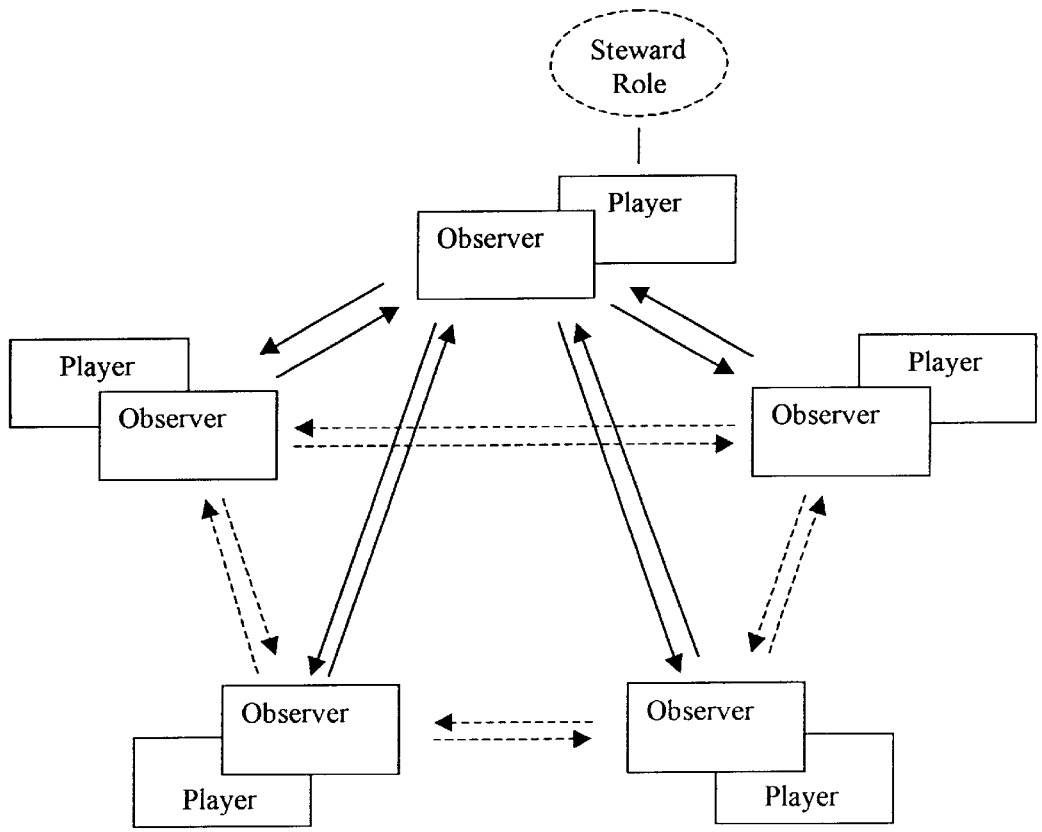
FIG. 14 shows the Observer Mechanism that performs the JUDGE function for a team of artificially intelligent machines.

In another preferred embodiment of this invention that applies to groups of artificially intelligent machines or computers working on a common task, intelligent software agent programs, such as Computer Associates Corporation's Neugent, neural network software agent, are included in the Action Selection Mechanism to fulfill the JUDGE function. In this case, the TIP (FIG. 3) is embodied in the collection of software programs including the neural network agents, called the Observer Mechanism shown in FIG. 14. A neural network software agent is a component part of an Observer that is associated with each Player. The Observer's function is to monitor the flow of communication and data to and from that Player to identify potentially valuable ACT Sequence actions. It uses its acquired experience to decide which alternative action sequences to explore for valued actions. One Observer will communicate with the other Observers using a peer-to-peer network to gather communication data. The STEWARD's intelligent software agent observes the interaction between Players by accessing the Observer associated with each Player. The Observer residing on the Player computer with the current Steward role, communicates with the other Observers using a star network topology that is overlaid on the peer-to-peer topology. This invention enables the team of artificially intelligent machines or computers to self-manage the process of integrating its member's activities while crafting a solution to attain a team goal when given only partial knowledge of how to achieve it.

CONCLUSION

Exploiting the full potential of team synergy remains one of the most important opportunities of the twenty-first century. Doing so will improve team productivity and provide enormous economic and social benefit for mankind. There is a compelling need in all areas of human endeavor for an effective method for valuing and measuring a team-member's contribution to the achievement of a team goal. In addition, the teaming of artificially intelligent machines to solve mankind's complex problems is becoming commonplace. This phenomenon has created a compelling need for an effective method for valuing and measuring an artificially intelligent machine's contribution to the achievement of a group goal. The deficiencies that exist within these methods for the interactions of humans also exist for the interaction of artificially intelligent machines.

This Method and Performance Feedback System eliminates these deficiencies by exposing successful actions and collaboration patterns. It provides a means to compare the contributions of team members with functionally different roles on the team, thereby making each team member accountable for his contribution to team achievement. This value relationship serves as a simple guide for individual team members to guide their choice of actions and collaborations to maximize their personal reward. In the Basketball example, the reduced set of player action-types filters out most player actions and exposes the critical few actions that directly contribute to winning. This exposure identifies winning behavior and enables team members to quickly learn from past successes; and enables team members to emulate winning behavior in future action.

In the Basketball Competitive Environment the Stage Sharing Factors are approximately equal. This has the profound effect of elevating rebounding and passing to the same level of importance to the success of an ACT Sequence, as shooting. It also enables players with these different functional skills to be accountable for their contribution to scoring points during a POSSESSION. The value/reward relationship that is established by this invention serves as a bridge between the team-members' natural tendency toward individuality and self-preservation, and the counter-intuitive human contrivance of team orientation.

The Performance Feedback System provides rapid processing and publishing of collected data, which enables team members to emulate successful behavior as the CONTEST continues. Summary data produced by the PFS can be used as a common currency to compare the performance of players on the same or different teams, as a basis for reward or team formulation. Total compliance with the PFS enables the team to self-manage its team-member interactions. To the degree that this protocol is followed, team-member interaction becomes self-managing. The empowerment of the STEWARD is the inverse of traditional team operation where the team manager, or coach, directly or indirectly through pre-determined role assignment and action sequences, decrees the interaction of team members. In the traditional case, team-members look to an external manager or their own personal interests, to subjectively validate their individual actions. The static nature of that approach does not empower the team to rapidly identify and act on opportunities. The traditional approach does not provide a means for easily resolving team-member conflict which arises from trying to set a unified team approach to the pursuit of the team goal, amid the uncertainty of the changing game environment.

What is claimed:

1. A method for identifying, selecting, valuing and integrating group-member actions that are causal to a group achievement, comprising:
   a) means for defining and valuing group member action-types,
   b) means for selecting group-member actions that are causal to group achievement,
   c) means for assigning the value of a group achievement to contributing group-member actions,
   d) means for calculating TEAMSHARE on an aggregate basis and storing and retrieving it from a database,
   e) means for guiding team members on how to integrate their activities in pursuit of specific pre-defined group goals, when given only partial understanding of how they can achieve said goal.

2. A system for identifying, selecting, valuing and integrating group-member actions that are causal to a group achievement, comprising:
   a) means for defining and valuing group-member actions that are causal to a group achievement,
   b) means for selecting group-member actions that are causal to group achievement,
   c) means for assigning the value of a group achievement to contributing group-member actions,
   d) means for calculating TEAMSHARE on an aggregate basis and storing and retrieving it from a database,
   e) means for (JUDGE) identifying valuable group-member action sequences,
   f) means for guiding team members on how to integrate their activities in pursuit of specific pre-defined group goals, when given only partial understanding of how they can achieve said goal.

3. The system of claim 2, wherein JUDGE is a human observer with a mechanism and supporting software embodied in a computer, comprising:
   a) head-mounted microphone and voice recognition software, with means for storing observed information in the database using software providing pre-progammed options specific to this process and to the related data collection event, and/or,
   b) head-mounted miniature video screen in the observer's field of view, with means for storing observed information in the database using software providing pre-progammed options specific to this process and to the related data collection event.

4. The system of claim 2, wherein JUDGE is unsupervised neural network embodied in a computer mechanism capable of identifying valuable action sequences, comprising:
   a) Players, representing group members pursuing a group achievement;
   b) Steward, representing a Player empowered to decide the course of group action in pursuit of the group goal,
   c) Observer, representing a neural network software agent that monitors said Player's communications and data transfers with other Players,
   d) Team-member Interaction Protocol, representing a communication and behavioral protocol applicable to group members,
   e) Means for software embodied in a computer to evaluate the instant activity observed by the JUDGE and immediately relate processed information appropriate for share awards to group members facilitating integration of activity incrementing group activity development for goal achievement.

* * * * *